(12) United States Patent
Wang et al.

(10) Patent No.: US 10,977,447 B2
(45) Date of Patent: Apr. 13, 2021

(54) METHOD AND DEVICE FOR IDENTIFYING A USER INTEREST, AND COMPUTER-READABLE STORAGE MEDIUM

(71) Applicant: PING AN TECHNOLOGY (SHENZHEN) CO., LTD., Guangdong (CN)

(72) Inventors: Jianzong Wang, Shenzhen (CN); Zhangcheng Huang, Shenzhen (CN); Tianbo Wu, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 301 days.

(21) Appl. No.: 16/318,818

(22) PCT Filed: Sep. 28, 2017

(86) PCT No.: PCT/CN2017/103944
§ 371 (c)(1),
(2) Date: Jan. 18, 2019

(87) PCT Pub. No.: WO2019/037195
PCT Pub. Date: Feb. 28, 2019

(65) Prior Publication Data
US 2021/0034819 A1    Feb. 4, 2021

(30) Foreign Application Priority Data

Aug. 25, 2017   (CN) .......................... 201710749088.0

(51) Int. Cl.
*G06F 40/279*    (2020.01)
*G06F 40/30*    (2020.01)
(Continued)

(52) U.S. Cl.
CPC .............. *G06F 40/30* (2020.01); *G06F 16/35* (2019.01); *G06F 40/166* (2020.01);
(Continued)

(58) Field of Classification Search
CPC .............. G06F 16/9535; G06F 16/248; G06F 16/3322; G06F 40/30; G06F 16/24;
(Continued)

(56) References Cited

U.S. PATENT DOCUMENTS 8,265,925 B2 *   9/2012   Aarskog ............... G06F 40/211
704/9
9,129,227 B1 *   9/2015   Yee ....................... G06F 16/248
(Continued)

FOREIGN PATENT DOCUMENTS

| CN | 103218436 | 7/2013 |
|---|---|---|
| CN | 106157151 | 11/2016 |
| JP | 2018559983 | 1/2020 |

OTHER PUBLICATIONS

Japanese Office Action dated Jan. 23, 2020 issued in corresponding Japanese Application No. 2018-559983.
(Continued)

*Primary Examiner* — Vijay B Chawan
(74) *Attorney, Agent, or Firm* — Hauptman Ham, LLP

(57) ABSTRACT

Disclosed is a method for identifying a user interest, including: obtaining training samples and test samples, the training samples being obtained by manually labeling after the corresponding topic models have been trained based on text data; extracting characteristics of the training samples and of the test samples, and computing optimal model parameters of a logistic regression model by an iterative algorithm based on the characteristics of the training samples; evaluating the logistic regression model based on the characteristics of the test samples and an area AUC under an ROC
(Continued)

curve to train and obtain a first theme classifier; determining a theme to which the text data belongs using the first theme classifier, computing a score of the theme to which the text data belongs based on the logistic regression model, and computing a confidence score of the user being interested in the theme according to a second preset algorithm. Further disclosed are a device for identifying a user interest and a computer-readable storage medium.

20 Claims, 6 Drawing Sheets

(51) Int. Cl.
| | | |
|---|---|---|
| *G06N 20/00* | (2019.01) | |
| *G06F 40/166* | (2020.01) | |
| *G06F 16/35* | (2019.01) | |
| *G06N 5/04* | (2006.01) | |

(52) U.S. Cl.
CPC ............. *G06F 40/279* (2020.01); *G06N 5/04* (2013.01); *G06N 20/00* (2019.01)

(58) Field of Classification Search
CPC ...... G06F 16/337; G06F 16/35; G06F 16/951; G06F 40/211; G06F 40/253; G06F 40/289; G06F 40/20; G06F 40/284; G06F 40/40; G06F 40/279; G06F 16/166; G06N 5/04; G06N 20/00; G06N 3/0454; G06N 3/08; G06N 3/006; G06N 3/02; G06N 5/022; G06N 7/005; G06N 3/082; G06N 5/02
USPC ............ 704/1, 10, 9, 270; 705/14.53, 14.66; 706/11, 50; 707/706, 707, 708, 722, 759, 707/771; 725/46
See application file for complete search history.

(56) References Cited

U.S. PATENT DOCUMENTS

| | | | |
|---|---|---|---|
| 9,477,752 B1 * | 10/2016 | Romano | G06F 16/367 |
| 9,552,555 B1 * | 1/2017 | Yee | G06F 16/24578 |
| 9,864,803 B2 * | 1/2018 | Liu | G06F 16/951 |
| 10,372,741 B2 * | 8/2019 | Mathew | G06F 16/35 |
| 10,578,445 B2 * | 3/2020 | Chen | G06N 3/0454 |
| 2003/0066068 A1 * | 4/2003 | Gutta | H04N 21/4661 725/9 |
| 2005/0108001 A1 * | 5/2005 | Aarskog | G06F 40/289 704/10 |
| 2010/0114929 A1 * | 5/2010 | Bonchi | G06F 16/3322 707/759 |
| 2012/0102121 A1 * | 4/2012 | Wu | G06Q 30/0282 709/206 |
| 2012/0143911 A1 * | 6/2012 | Liebald | G06F 16/337 707/771 |
| 2013/0173524 A1 * | 7/2013 | Hueter | G06N 5/02 706/50 |
| 2014/0032529 A1 * | 1/2014 | Chang | G06F 16/248 707/722 |
| 2015/0213363 A1 * | 7/2015 | Lahav | G06F 16/9577 706/11 |
| 2016/0019587 A1 * | 1/2016 | Hueter | G06N 20/00 705/14.53 |
| 2016/0203523 A1 * | 7/2016 | Spasojevic | G06Q 30/0269 705/14.66 |
| 2017/0024389 A1 * | 1/2017 | Liu | G06F 16/951 |
| 2017/0075991 A1 * | 3/2017 | Kataria | G06F 16/337 |
| 2017/0103343 A1 * | 4/2017 | Yee | G06N 7/005 |
| 2017/0186030 A1 * | 6/2017 | Jiang | G06F 16/245 |
| 2018/0101765 A1 * | 4/2018 | Chiang | G06N 3/0454 |
| 2018/0364054 A1 * | 12/2018 | Chen | G01C 21/3476 |
| 2018/0365522 A1 * | 12/2018 | Jiang | G06Q 30/0201 |

OTHER PUBLICATIONS

Singapore Office Action dated Mar. 19, 2020 from corresponding Singapore Application No. SG11201902986Q.
International search report dated May 18, 2018 from corresponding application No. PCT/CN2017/103944.
Office Action dated Jan. 25, 2018 from corresponding application No. CN 201710749088.0 .

* cited by examiner

METHOD AND DEVICE FOR IDENTIFYING A USER INTEREST, AND COMPUTER-READABLE STORAGE MEDIUM

CROSS-REFERENCE TO RELATED APPLICATIONS

The present application is the National Stage of International Application No. PCT/CN2017/103944, filed Sep. 28, 2017, which claims the benefit of China Patent Application No. 201710749088.0, filed Aug. 25, 2017 with the State Intellectual Property Office and entitled "Method and Device for Identifying a User Interest, and Computer-readable Storage Medium".

TECHNICAL FIELD

The present disclosure relates to the field of data processing, and more particularly relates to a method and a device for identifying a user interest, as well as a computer-readable storage medium.

BACKGROUND

In recent years, with the rapid development of the Internet, especially the sudden rise of social media, people are increasingly aware of the social media's various influences on themselves and on the information dissemination environment. In the past, people have been passively obtaining information from the Internet all along. Nowadays, however, more and more people are actively participating in the generation and dissemination of information on social media, resulting in a huge amount of user information and social relationship information.

But currently the internal data of many enterprises are usually mostly transaction records. The included customer information is not comprehensive enough to accurately determine potential customers and understand user needs. Therefore, how to identify a user's interest and fully understand the user through Internet data information thus helping enterprises to accurately determine potential customers has become a problem that needs to be solved urgently.

SUMMARY

It is therefore one primary object of the present disclosure to provide a method and a device for identifying a user interest as well as a computer-readable storage medium, aiming to identify a user's interest and fully understand the user through data information of the Internet, thereby helping the enterprises to quickly and accurately determine potential customers, and improving marketing effectiveness.

To achieve the foregoing objective, this disclosure provides a method for identifying a user interest, the method include the following operations: obtaining training samples and test samples, where the training samples are obtained by manually labeling after the corresponding topic models have been trained based on text data; extracting the characteristics of the training samples and of the test samples using a first preset algorithm, computing the optimal model parameters of a logistic regression model using an iterative algorithm based on the characteristics of the training samples, so as to train and obtain a logistic regression model containing the optimal model parameters; plotting a receiver operating characteristic (ROC) curve based on the characteristics of the test sample and the logistic regression model containing the optimal model parameters, and evaluating the logistic regression model containing the optimal model parameters based on an area AUC under the ROC curve so as to train and obtain a first theme classifier; classifying the text data using the first theme classifier to determine a theme to which the text data belongs, and computing a score of the theme to which the text data belongs according to the logistic regression model containing the optimal model parameters; and computing a confidence score of the user who writes the text data being interested in the theme based on the score and a second preset algorithm, and identifying an interest of the user based on the confidence score.

In addition, in order to achieve the above object, the present disclosure further provides a device for identifying a user interest. The device includes a memory, a processor, and a user interest identification program that is stored on the memory and operable on the processor, the user interest identification program performing the operations of the above method for identifying a user interest when executed by the processor.

In addition, in order to achieve the foregoing object, the present disclosure further provides a computer-readable storage medium having stored therein a user interest identification program, which when executed by a processor performs the operations of the method for identifying a user interest as described above.

According to this disclosure, training samples and test samples are obtained, where the training samples are obtained by manually labeling after the corresponding topic models have been trained based on text data. Then characteristics of the training samples and of the test samples are extracted using a first preset algorithm, and the optimal model parameters of a logistic regression model are computed by an iterative algorithm based on the characteristics of the training samples. The logistic regression model with the optimal model parameters is then evaluated based on the characteristics of the test samples and the area AUC under the ROC curve, so as to train and obtain a first theme classifier. Afterwards, the first theme classifier is used to classify the text data to determine the theme to which the text data belongs, and a score of the theme to which the text data belongs is computed according to the logistic regression model containing the optimal model parameters. Then based on the score and a second preset algorithm, a confidence score of the user who writes the text data being interested in the theme is computed. Thus, the confidence score is based on to identify an interest of the user. In the above manner, the present disclosure uses the first preset algorithm to extract the characteristics of the training samples and the test samples, thus shortening the time required for feature extraction and model training, and so improving the classification efficiency. The present disclosure adopts a manual labeling method to select the training samples, and further uses the area AUC under the ROC curve to evaluate the logistic regression model with the optimal model parameters so as to train and obtain the theme classifier, thus improving the accuracy of the theme classification. Meanwhile, the present disclosure utilizes the logistic regression model with optimal model parameters as well as a second preset algorithm, which can improve the accuracy of the confidence score calculation. Thus, based on the computed confidence score of the user being interested in the theme, the user's interest can be identified, helping the enterprises to understand the user in a comprehensive way and thereby quickly and accurately locate the potential customers, thereby improving the marketing efficiency.

BRIEF DESCRIPTION OF THE ACCOMPANYING DRAWINGS

Figure 3:
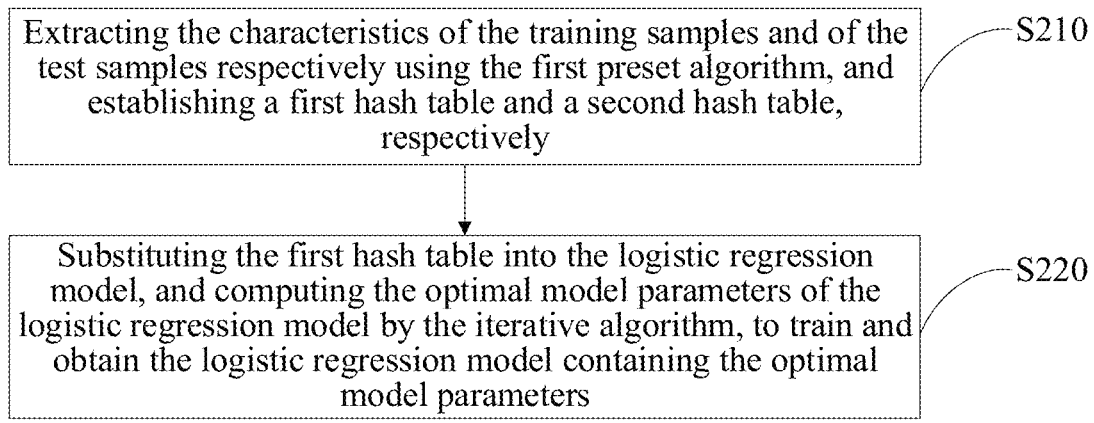

FIG. 3 is a detailed flowchart illustrating the block of "extracting characteristics of the training samples and of the test samples respectively using a first preset algorithm, computing optimal model parameters of a logistic regression model using an iterative algorithm based on the characteristics of the training samples, so as to train and obtain a logistic regression model containing the optimal model parameters", according to an embodiment of the present disclosure.

Figure 4:
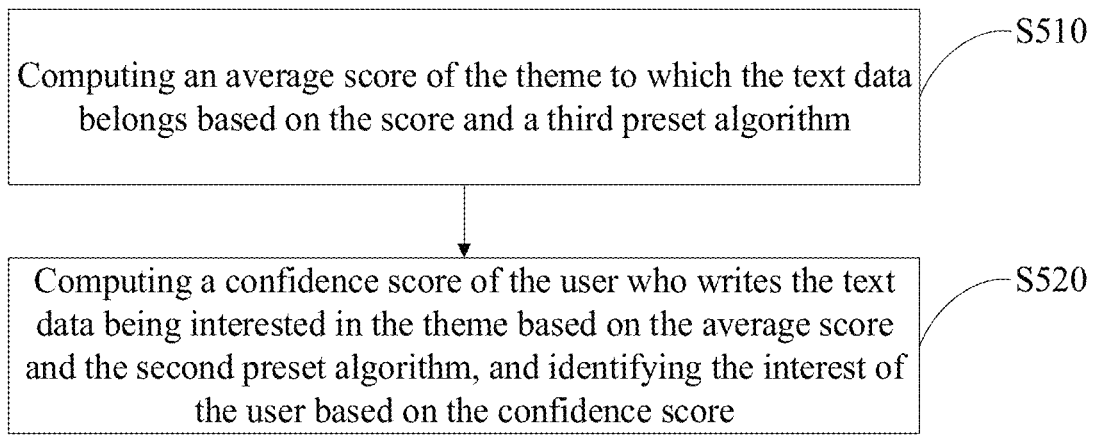

FIG. 4 is shown a detailed flowchart illustrating the block of "computing the confidence score of the user who writes the text data being interested in the theme based on the score and a second preset algorithm and identifying an interest of the user based on the confidence score", according to an embodiment of the present disclosure.

Figure 5:
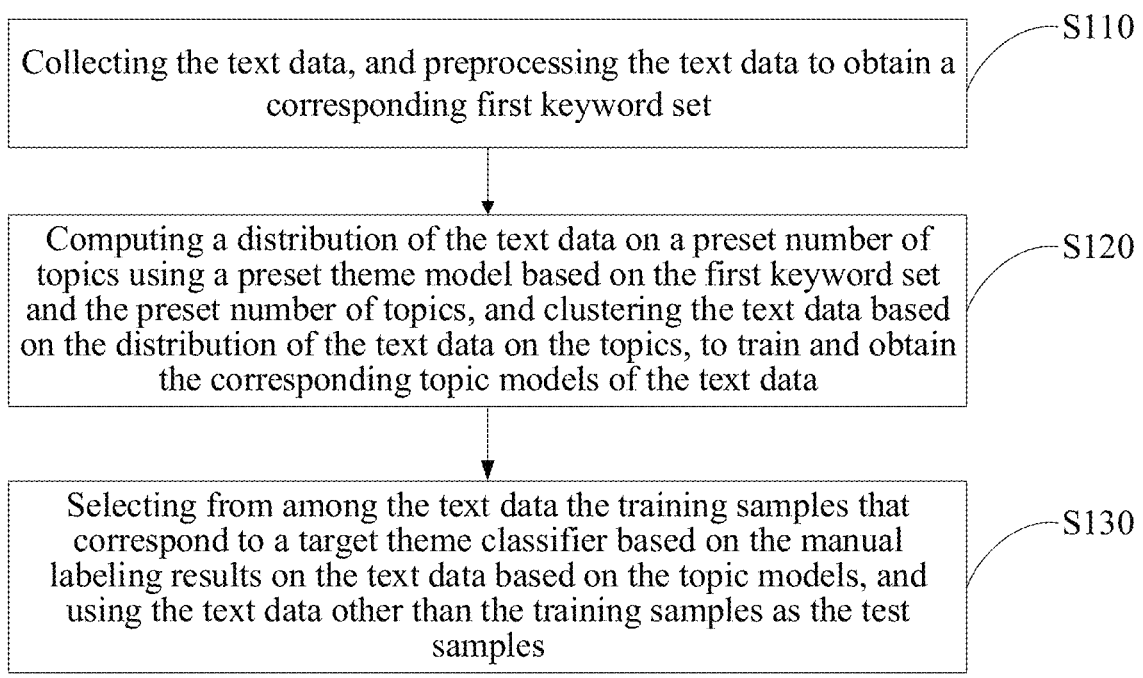

FIG. 5 is a detailed flowchart illustrating the block of "obtaining training samples and test samples, where the training samples are obtained by manually labeling after the corresponding topic models have been trained based on text data", according to an embodiment of the present disclosure.

Figure 6:
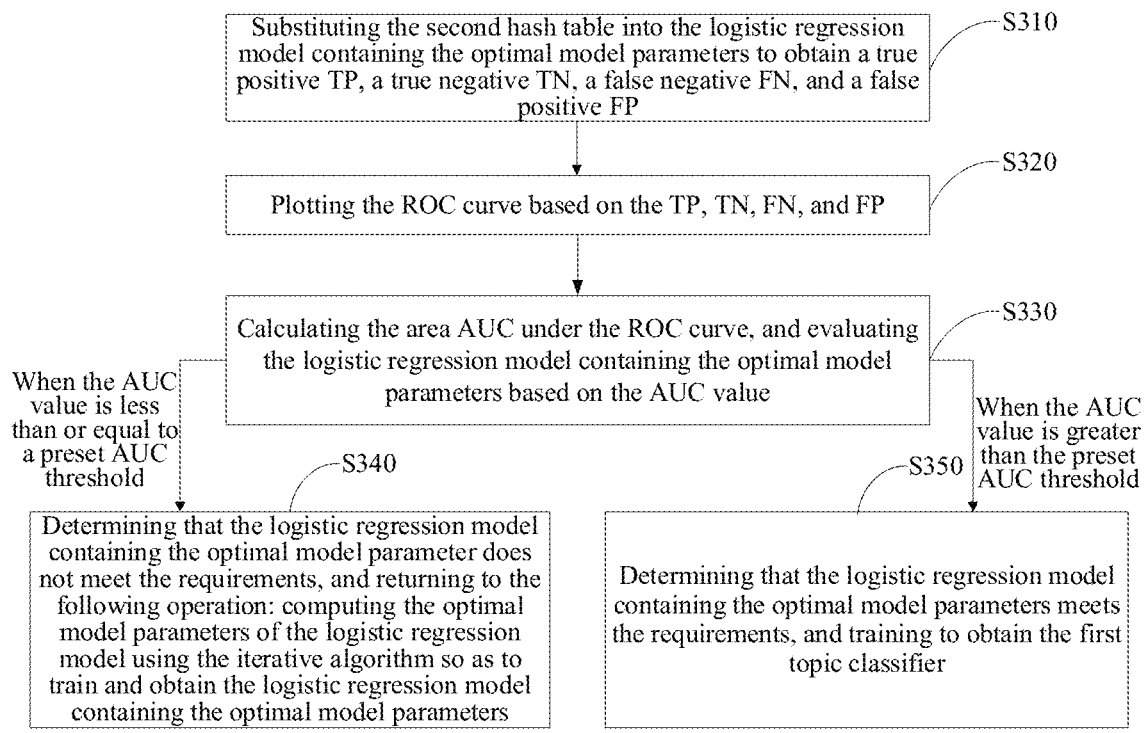

FIG. 6 is a detailed flowchart illustrating the block of "plotting a receiver operating characteristic (ROC) curve based on the characteristics of the test samples and the logistic regression model containing the optimal model parameters, and evaluating the logistic regression model containing the optimal model parameters based on an area AUC under the ROC curve so as to train and obtain a first theme classifier", according to an embodiment of the present disclosure.

Figure 7:
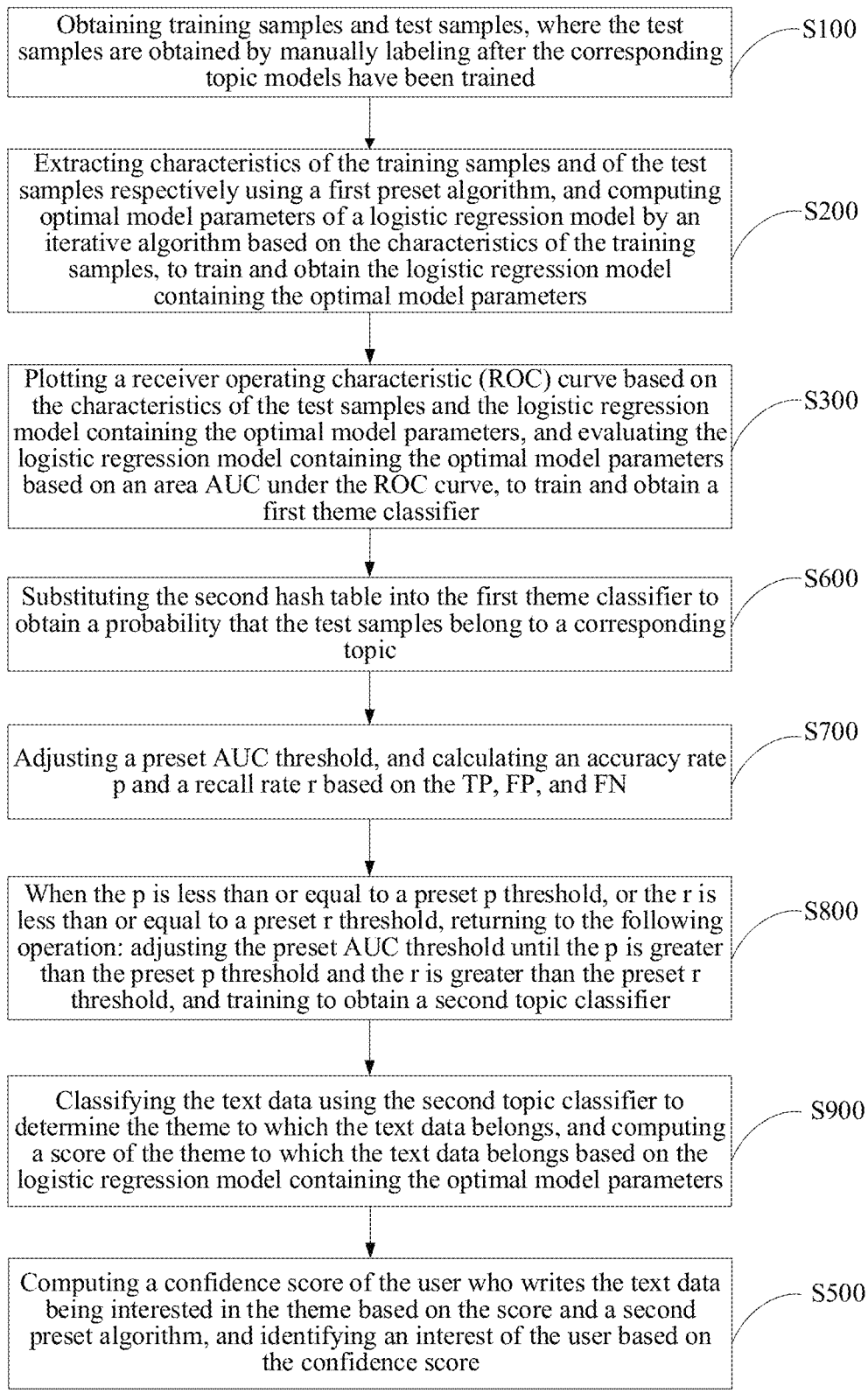

FIG. 7 is a flowchart illustrating a second embodiment of the method for identifying a user interest in accordance with this disclosure.

Figure 8:
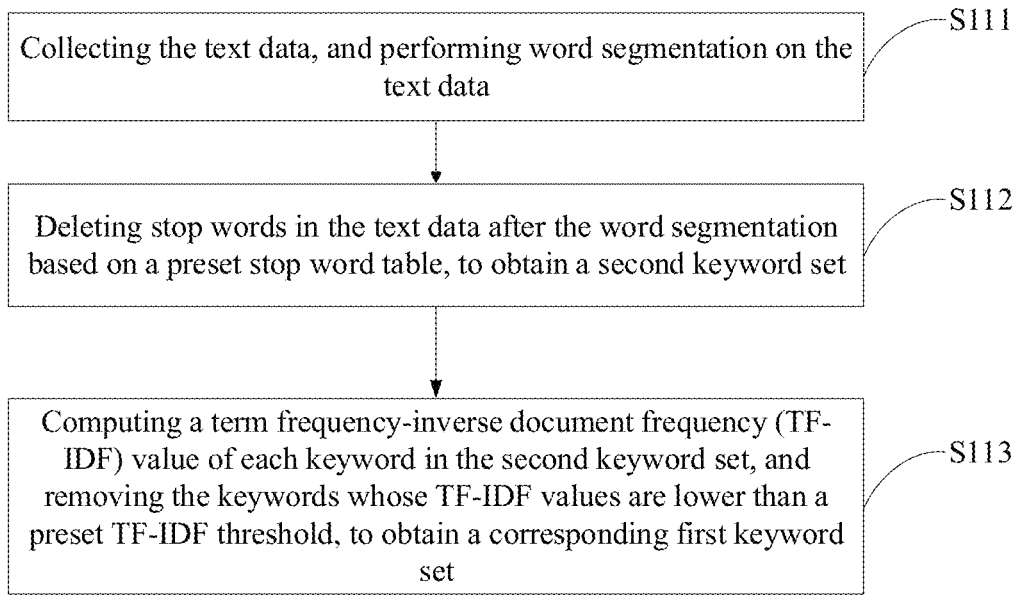

FIG. 8 is a detailed flowchart illustrating the block of "collecting text data and preprocessing the text data to obtain a corresponding first keyword set", according to an embodiment of the present disclosure.

Figure 9:
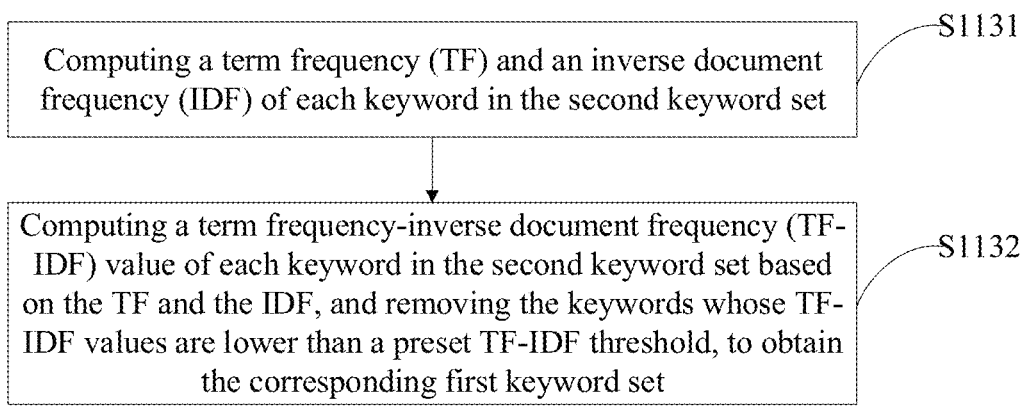

FIG. 9 is a detailed flowchart illustrating the block of "computing a term frequency-inverse document frequency (TF-IDF) value of each keyword in the second keyword set, and removing the keywords whose TF-IDF values are each lower than a preset TF-IDF threshold, so as to obtain the corresponding first keyword set", according to an embodiment of the present disclosure.

Various implementations, functional features, and advantages of this disclosure will now be described in further detail in connection with some illustrative embodiments and the accompanying drawings.

DETAILED DESCRIPTION OF ILLUSTRATIVE EMBODIMENTS

It will be appreciated that the specific embodiments described herein are merely illustrative of the disclosure and are not intended to limit the disclosure.

Due to the low classification efficiency and accuracy of the existing classification techniques, it is difficult for a user to quickly and accurately obtain the required relevant theme information when facing a huge amount of information resources.

In order to solve the above-mentioned technical problem, the present disclosure provides a method for identifying a user interest. According to the method, training samples and test samples are obtained, where the training samples are obtained by manually labeling after the corresponding topic models have been trained based on text data. Then the characteristics of the training samples and of the test samples are extracted using a first preset algorithm, and the optimal model parameters of a logistic regression model are computed by an iterative algorithm based on the characteristics of the training samples. The logistic regression model with the optimal model parameters is then evaluated based on the characteristics of the test samples and the area AUC under the ROC curve, so as to train and obtain a first theme classifier. Afterwards, the first theme classifier is used to classify the text data to determine the theme to which the text data belongs, and a score of the theme to which the text data belongs is computed according to the logistic regression model containing the optimal model parameters. Then based on the score and a second preset algorithm, a confidence score of the user who writes the text data being interested in the theme is computed. Thus, the confidence score is based on to identify the interest of the user. In the above manner, the present disclosure uses the first preset algorithm to extract the characteristics of the training samples and the test samples, thus shortening the time required for feature extraction and model training, and so improving the classification efficiency. The present disclosure adopts a manual labeling method to select the training samples, and further uses the area AUC under the ROC curve to evaluate the logistic regression model with the optimal model parameters so as to train and obtain the theme classifier, thus improving the accuracy of the theme classification. Meanwhile, the present disclosure utilizes the logistic regression model with an optimal model parameters as well as a second preset algorithm, which can improve the accuracy of the confidence score calculation. Thus, based on the computed confidence score of the user being interested in the theme, the user's interest can be identified, helping the enterprises to understand the user in a comprehensive way and thereby quickly and accurately locate the potential customers, thereby improving the marketing efficiency.

Figure 1:
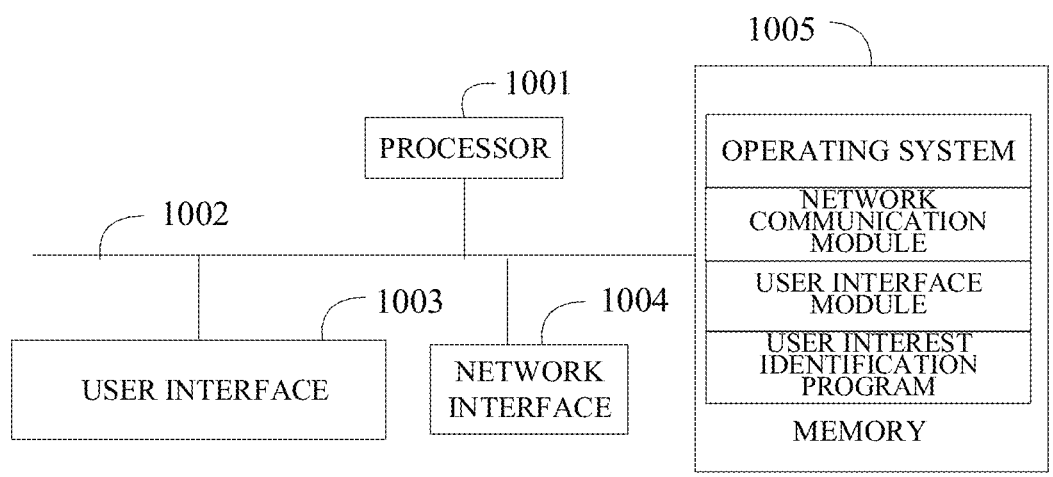
FIG. 1 is a schematic diagram illustrating the structure of a device for identifying a user interest in accordance with the solutions represented by the embodiments disclosed in the present disclosure.

FIG. 1 is a schematic diagram illustrating the structure of a device for identifying a user interest in accordance with the solutions represented by the embodiments disclosed in the present disclosure.

The device according to the embodiments disclosed herein may be a personal computer (PC), or may be a terminal device equipped with display functionality, such as a smart phone, a tablet computer, or a portable computer.

As illustrated in FIG. 1, the device may include a processor 1001 (such as a CPU), a network interface 1004, a user interface 1003, a memory 1005, and a communication bus 1002. The communication bus 1002 is configured to facilitate connection and communication between these components. The user interface 1003 may include a display, an input unit such as a keyboard, and the user interface 1003 may optionally include a standard wired interface and wireless interface. The network interface 1004 may optionally include a standard wired interface, and a wireless interface (such as a WI-FI interface). The memory 1005 may be a high-speed RAM memory, or a non-volatile memory such as a disk memory. The memory 1005 optionally may also be a storage device that is separate from the processor 1001 described above.

Optionally, the device may further include a camera, an RF (Radio Frequency) circuitry, a sensor, an audio circuitry, a WiFi module, and the like. The sensor can be, e.g., an optical sensor, a motion sensor, or another sensor. Specifically, the optical sensor may include an ambient light sensor and a proximity sensor. The ambient light sensor may adjust the brightness of the display screen based on brightness of the ambient light. The proximity sensor may turn off the display screen and/or the backlight when the device moves near the ear. As a type of motion sensor, the gravity acceleration sensor can detect the magnitude of acceleration in each direction (usually along three axes). When at rest, the gravity acceleration sensor can detect the magnitude and direction of gravity and thus can be applied to various applications which identify the attitude of the device (e.g., applications for switching between landscape and portrait screen modes, related games, magnetometer attitude calibration), vibration recognition related functions (e.g., pedometer, tapping), etc. Of course, the device also can further be equipped with a gyroscope, a barometer, a hygrometer, a thermometer, an infrared sensor, and the like, which however are not to be detailed herein.

Those skilled in the art can understand that the structure of the device illustrated in FIG. 1 does not constitute a limitation on the device. Thus, the device may include more or less components than those illustrated, or some components may be combined, or different arrangements of components may be employed.

As illustrated in FIG. 1, the memory 1005 as a computer-readable storage medium may include an operating system, a network communication module, a user interface module, and a user interest identification program.

In the device illustrated in FIG. 1, the network interface 1004 is mainly used to connect to a backend server for data communication with the backend server. The user interface 1003 is mainly configured to connect to a client (user end) for data communication with the client. The processor 1001 can be configured to call the user interest identification program stored in the memory 1005 to perform the following operations: obtaining training samples and test samples, where the training samples are obtained by manually labeling after the corresponding topic models have been trained based on text data; extracting characteristics of the training samples and of the test samples using a first preset algorithm, computing the optimal model parameters of a logistic regression model using an iterative algorithm based on the characteristics of the training samples, so as to train and obtain a logistic regression model containing the optimal model parameters; plotting a receiver operating characteristic (ROC) curve based on the characteristics of the test samples and the logistic regression model containing the optimal model parameters, and evaluating the logistic regression model containing the optimal model parameters based on an area AUC under the ROC curve so as to train and obtain a first theme classifier; classifying the text data using the first theme classifier to determine a theme to which the text data belongs, and computing a score of the theme to which the text data belongs according to the logistic regression model containing the optimal model parameters; and computing a confidence score of the user who writes the text data being interested in the theme based on the score and a second preset algorithm, and identifying an interest of the user based on the confidence score.

Further, the processor 1001 may call the user interest identification program stored in the memory 1005 to perform the following operations: computing an average score of the theme to which the text data belongs based on the score and a third preset algorithm; and computing a confidence score of the user who writes the text data being interested in the theme based on the average score and a second preset algorithm, and identifying an interest of the user based on the confidence score.

Further, the processor 1001 may call the user interest identification program stored in the memory 1005 to perform the following operations:

the computation formula of the third preset algorithm is as follows:

$$Avg(u_i, topic_j) = \frac{\sum_{m=1}^{n} s(u_i, tweet_m, topic_j)}{n},$$

where $Avg(u_i, topic_j)$ represents the average score of the user $u_i$ on the theme $topic_j$, $s(u_i, tweet_m, topic_j)$ represents the score of the user $u_i$'s text data $tweet_m$ belonging to the theme $topic_j$ after having been classified, and n represents the total number of text data messages related to the theme $topic_j$ in the user $u_i$'s text data messages $tweet_m$.

Further, the processor 1001 may call the user interest identification program stored in the memory 1005 to perform the following operations:

the computation formula of the second preset algorithm is as follows:

$$k_j = \frac{10}{\max(TN_j) - \min(TN_j)}, x_{j0} = \operatorname{median}(TN_j),$$

$$s(u_i, topic_j, TN_{ij}) = \frac{TN_{ij} * Avg(u_i, topic_j)}{1 + e^{-k_j*(TN_{ij}-x_{j0})}},$$

where $TN_j$ represents the number of texts of all the users where the users are interested in the theme $topic_j$, $x_{j0}$ denotes a median of $TN_j$, $TN_{ij}$ represents the number of microblogs related to the theme $topic_j$ that are published by the user $u_i$, and $s(u_i, topic_j, TN_{ij})$ denotes the confidence score of the user $u_i$ being interested in the theme $topic_j$.

Further, the processor 1001 may call the user interest identification program stored in the memory 1005 to perform the following operations: collecting text data, and preprocessing the text data to obtain a corresponding first keyword set; computing a distribution of the text data on a preset number of topics using a preset theme model based on the first keyword set and the preset number of topics, and clustering the text data based on the distribution of the text data on the topics to train and obtain corresponding topic models of the text data; and selecting from among the text data the training samples that correspond to a target theme classifier based on the manual labeling results on the text data based on the topic models, and using the text data other than the training sample as the test samples.

Further, the processor 1001 may call the user interest identification program stored in the memory 1005 to perform the following operations: extracting the characteristics of the training samples and of the test samples using the first preset algorithm, and establishing a first hash table and a second hash table; and substituting the first hash table into the logistic regression model, and computing the optimal model parameters of the logistic regression model using the iterative algorithm, so as to train and obtain the logistic regression model containing the optimal model parameters.

Further, the processor 1001 may call the user interest identification program stored in the memory 1005 to perform the following operations: substituting the second hash table into the logistic regression model containing the optimal model parameters to obtain a true positive TP, a true negative TN, a false negative FN, and a false positive FP; plotting an ROC curve based on the TP, TN, FN, and FP; calculating the area AUC under the ROC curve, and evaluating the logistic regression model containing the optimal model parameters based on the AUC value; when the AUC value is less than or equal to a preset AUC threshold, determining that the logistic regression model with the optimal model parameter does not meet the requirements, and returning to the following operation: computing the optimal model parameters of the logistic regression model using the iterative algorithm so as to train and obtain the logistic regression model containing the optimal model parameters; otherwise when the AUC value is greater than the preset AUC threshold, determining that the logistic regression model containing the optimal model parameters meets the requirements, and training to obtain the first theme classifier.

Further, the processor 1001 may call the user interest identification program stored in the memory 1005 to perform the following operations: calculating a false positive rate FPR and a true positive rate TPR based on the TP, TN, FN, and FP, where the respective calculation formulas are FPR=FP/(FP+TN), TPR=TP/(TP+FN); and ploting the ROC curve with the FPR as the abscissa and the TPR as the ordinate.

Further, the processor 1001 may call the user interest identification program stored in the memory 1005 to perform the following operations: substituting the second hash table into the first theme classifier to obtain a probability that the test sample belongs to a corresponding topic; adjusting the preset AUC threshold, and calculating an accuracy rate p and a recall rate r based on the TP, FP, and FN; when the p is less than or equal to a preset p threshold, or the r is less than or equal to a preset r threshold, returning to the following operation: adjusting the preset AUC threshold until the p is greater than the preset p threshold and the r is greater than the preset r threshold, and training to obtain a second theme classifier; where classifying the text data using the first theme classifier to determine a theme to which the text data belongs includes the following operation: classifying the text data using the second theme classifier to determine a theme to which the text data belongs.

Further, the processor 1001 may call the user interest identification program stored in the memory 1005 to perform the following operations: collecting text data, and performing word segmentation on the text data; deleting the stop words in the text data that is word-segmented based on a preset stop word table, so as to obtain a second keyword set; and computing a term frequency-inverse document frequency (TF-IDF) value of each keyword in the second keyword set, and removing the keywords whose TF-IDF values are each lower than a preset TF-IDF threshold, so as to obtain the corresponding first keyword set.

Further, the processor 1001 may call the user interest identification program stored in the memory 1005 to perform the following operations: computing a term frequency (TF) and an inverse document frequency (IDF) of each keyword in the second keyword set; and computing a term frequency-inverse document frequency (TF-IDF) value of each keyword in the second keyword set based on the TF and the IDF, and removing the keywords whose TF-IDF values are each lower than a preset TF-IDF threshold, so as to obtain the corresponding first keyword set.

Figure 2:
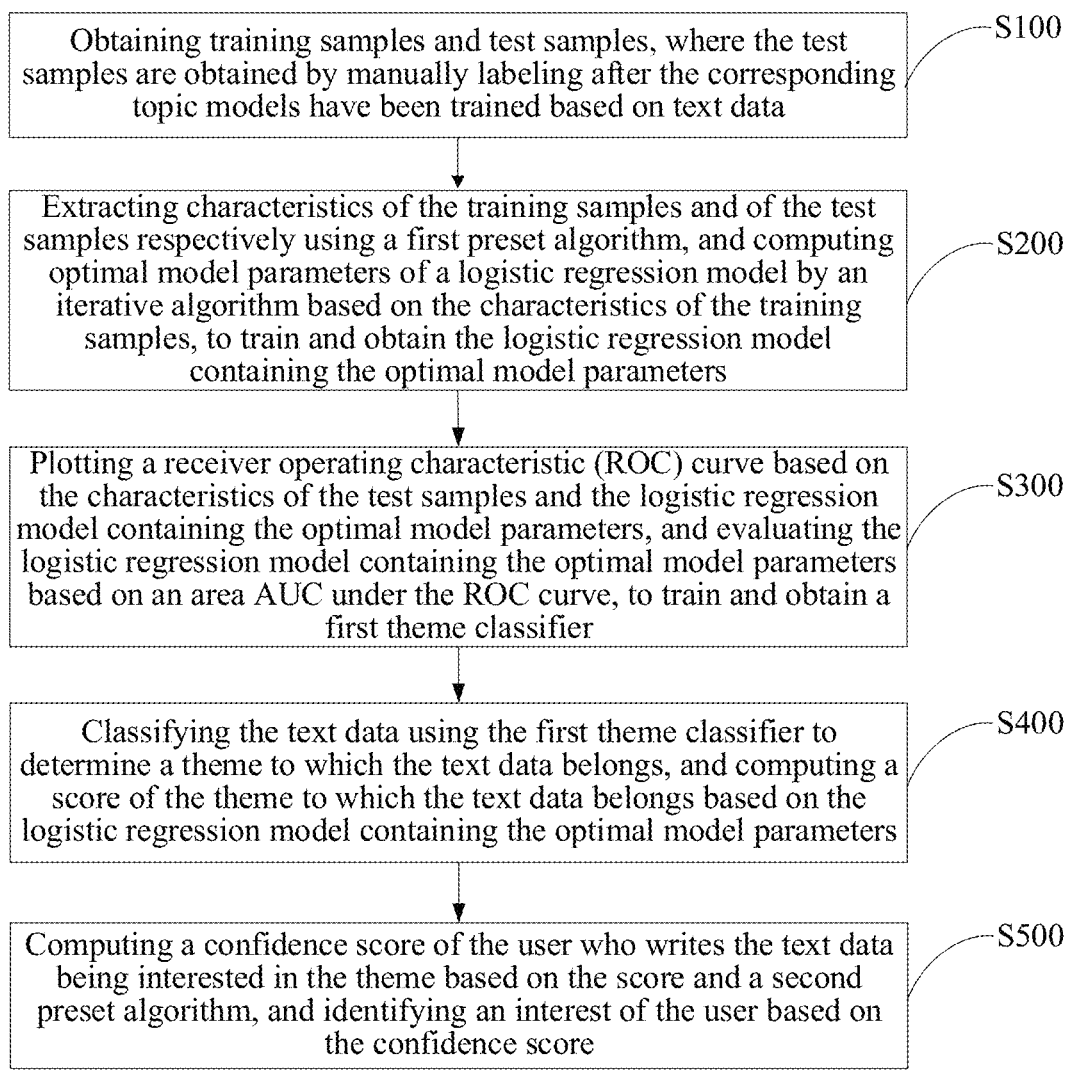
FIG. 2 is a flowchart illustrating a first embodiment of a method for identifying a user interest in accordance with this disclosure.

FIG. 2 is a flowchart illustrating a first embodiment of a method for identifying a user interest in accordance with this disclosure.

In this embodiment, the method for identifying a user interest includes the following blocks S100, S200, S300, and S400.

In S100, training samples and test samples are obtained, where the training samples are obtained by manually labeling after the corresponding topic models have been trained based on text data.

In this embodiment, the training samples and the test samples required for training a theme classifier are obtained. The training samples are obtained by manually labeling after the corresponding topic models have been trained based on text data, and are used for optimizing the parameters of the model. The test samples are the text data other than the training samples, and are used to evaluate the performance of the established model. In specific embodiments, the training samples and the test samples can also be obtained by using a program, such as the Svmtrain function of the mathematical software Matlab, to directly sample from the microblogs found in the Internet. The method then proceeds to block S200.

In S200, the method includes extracting the characteristics of the training samples and of the test samples using a first preset algorithm, computing the optimal model parameters of a logistic regression model using an iterative algorithm based on the characteristics of the training samples, so as to train and obtain a logistic regression model containing the optimal model parameters.

Specifically, FIG. 3 is a detailed flowchart illustrating the block of extracting the characteristics of the training samples and of the test samples using a first preset algorithm, computing the optimal model parameters of a logistic regression model using an iterative algorithm based on the characteristics of the training samples, so as to train and obtain a logistic regression model containing the optimal model parameters. As illustrated in the flowchart, block S200 includes the following operations S210 and S220.

In S210, the block includes extracting the characteristics of the training samples and of the test samples using the first preset algorithm, and establishing a first hash table and a second hash table.

In this embodiment, characteristics of the training samples and of the test samples are respectively extracted using the first preset algorithm. In this embodiment, a Byte 4-gram algorithm of a binary hash table is used to separately extract the characteristics of the training samples and of the test samples, so that each training sample or each test sample is correspondingly represented as a feature vector consisting of a set of features. This method extracts every consecutive 4 bytes in the data of each training sample or each test sample as a key, so that the character string is converted into a byte array, which corresponds to the UTF-8 encoding of the character string and which is a 32-bit integer. Further, a hash function is constructed by a division-remainder method, and a first hash table and a second hash table are established, respectively. It should be noted that the hash function formula for the hash table length m is: f(key)=key mod p, (p≥m), where mod represents the operation for finding the remainder. In specific implementations, in order to reduce the occurrence of collisions thus preventing the distribution of the hash table from being too sparse, p is usually taken the largest prime number less than the hash table length.

In S220, the block includes substituting the first hash table into the logistic regression model, and computing the optimal model parameters of the logistic regression model using the iterative algorithm, so as to train and obtain the logistic regression model containing the optimal model parameters.

Further, the first hash table is substituted into the logistic regression model, and the optimal model parameters are iteratively computed by an optimization method so as to train and obtain the logistic regression model. The logistic regression model is used to estimate the possibility of a certain thing, or in other words, to determine the probability that a sample belongs to a certain category. The logistic regression model is as follows:

$$h_\theta(x^{(i)}) = g(\theta^T x^{(i)}) = \frac{1}{1+e^{-\theta^T x^{(i)}}}, \theta^T x^{(i)} = \sum_{j=0}^{n} \theta_i x_j^{(i)},$$

where $x_j$ represents the feature vector of the jth training sample, $x^{(i)}$ represents the ith sampling, and $\theta$ represents the model parameters.

In addition, it should be noted that the iterative algorithm includes gradient descent, conjugate gradient method, quasi-Newton method, and the like. In specific embodiments, the optimal model parameters of the logistic regression model can be computed by any of the above iterative algorithms so as to train and obtain the logistic regression model containing the optimal model parameters. Of course, in specific embodiments, other methods may also be used to separately extract features of the training samples and the test samples, such as vector space model VSM, information gain method, desired cross entropy, and the like. The method then continues to block S300.

In S300, the method includes plotting a receiver operating characteristic (ROC) curve based on the characteristics of the test sample and the logistic regression model containing the optimal model parameters, and evaluating the logistic regression model containing the optimal model parameters based on an area AUC under the ROC curve so as to train and obtain a first theme classifier.

In this embodiment, the second hash table created based on the test sample is substituted into the logistic regression model containing the optimal model parameters, so as to obtain a true positive TP, a true negative TN, a false negative FN and a false positive FP, wherein TP is the number of positive training samples that still belongs to the positive category after performing a determination on the positive training samples using the logistic regression model, TN is the number of negative training samples that still belongs to the negative category after performing a determination on the negative training samples using the logistic regression model, FN is the number of negative training samples that belongs to the positive category after performing a determination on the negative training samples using the logistic regression model, and FP is the number of positive training samples that belongs to the negative category after performing a determination on the positive training samples. The positive category and the negative category refer to two categories that are manually labeled on training samples. Simply put, if a sample is manually labeled as belonging to a specific category, then the sample belongs to the positive category, otherwise a sample that does not belong to that particular class belongs to the negative category. Then based on the TP, TN, FN and FP, the false positive rate FPR and the true positive rate TPR are calculated. Taking FPR as the abscissa and TPR as the ordinate, the ROC curve is plotted. The ROC curve is a characteristic curve of the various obtained indices, and is used to demonstrate the relationships between the various indices. Further, the area AUC under the ROC curve is calculated. The ROC curve is a characteristic curve of the various obtained indices and is used to demonstrate the relationships between the various indices. The AUC refers to the area under the ROC curve, and the greater AUC the better. A greater AUC suggests that the test has a higher diagnostic value. Then the logistic regression model containing the optimal model parameters is evaluated. When the AUC value is less than or equal to a preset AUC threshold, then the logistic regression model containing the optimal model parameters would be determined as not meeting the requirements, and the process will return to the following operation: computing the optimal model parameters of the logistic regression model by the iterative algorithm so as to train and obtain the logistic regression model containing the optimal model parameters, until the AUC value is greater than the preset AUC threshold, then at this point the logistic regression model containing the optimal model parameters would be determined as meeting the requirements, and training to obtain the first theme classifier. The method then proceeds to block S400.

In S400, the method includes classifying the text data using the first theme classifier to determine a theme to which the text data belongs, and computing a score of the theme to which the text data belongs according to the logistic regression model containing the optimal model parameters. The method then continues to block S500.

In S500, the method includes computing a confidence score of the user who writes the text data being interested in the theme based on the score and a second preset algorithm, and identifying an interest of the user based on the confidence score.

Specifically, referring to FIG. 4, there is shown a detailed flowchart illustrating the process of computing the confidence score of the user who writes the text data being interested in the theme based on the score and a second preset algorithm and identifying an interest of the user based on the confidence score, according to an embodiment of the present disclosure. As illustrated in the detailed flowchart, block S500 includes the following operations S510 and S520.

In S510, the block includes computing an average score of the theme to which the text data belongs based on the score and a third preset algorithm.

In S520, the method includes computing a confidence score of the user who writes the text data being interested in the theme based on the average score and a second preset algorithm, and identifying an interest of the user based on the confidence score.

In this embodiment, the trained first theme classifier is used to classify the text data so as to determine the theme to which the text data belongs. Then the text data corresponding to the target theme is selected therefrom, and the score of the text data that corresponds to the target theme on the target theme is computed based on the logistic regression model containing the optimal model parameters. Then this score and a third preset algorithm are based on to compute an average score of the theme to which the text data corresponding to the target theme belongs to. The computation formula of the third preset algorithm is as follows:

$$Avg(u_i, topic_j) = \frac{\sum_{m=1}^{n} s(u_i, tweet_m, topic_j)}{n},$$

where $Avg(u_i, topic_j)$ represents the average score of the user $u_i$ on the theme $topic_j$, $s(u_i, tweet_m, topic_j)$ represents the score of the user $u_i$'s text data $tweet_m$ belonging to the theme $topic_j$ after having been classified, and n represents the total number of text data messages related to the theme $topic_j$ in the user $u_i$'s text data messages $tweet_m$.

Further, the confidence score of the user who writes the text data being interested in the theme is computed based on the average score and a second preset algorithm. The computation formula of the second preset algorithm is as follows:

$$k_j = \frac{10}{\max(TN_j) - \min(TN_j)}, x_{j0} = \text{median}(TN_j),$$

$$s(u_i, topic_j, TN_{ij}) = \frac{TN_{ij} * Avg(u_i, topic_j)}{1 + e^{-k_j*(TN_{ij} - x_{j0})}},$$

where $TN_j$ represents the number of texts of all the users where the users are interested in the theme $topic_j$, $x_{j0}$ denotes a median of $TN_j$, $TN_{ij}$ represents the number of microblogs related to the theme $topic_j$ that are published by the user $u_i$, and $s(u_i, topic_j, TN_{ij})$ denotes the confidence score of the user $u_i$ being interested in the theme $topic_j$.

Further, the user's interest is identified based on the computed confidence score. For example, based on the fact that the first theme classifier determines that the user's microblog text data belongs to a financial topic, and the calculated confidence score is greater than a preset confidence threshold, then it indicates that the user is interested in financial products, thereby helping financial companies to locate this potential user. As such, these financial companies can recommend relevant financial products to this user.

In addition, it should be noted that in this embodiment, when classifying the text data by using the first theme classifier, the text data may be the text data described in block S100, or may also be text data obtained from other social networking platforms or information resource databases.

According to this embodiment, training samples and test samples are obtained, where the training samples are obtained by manually labeling after the corresponding topic models have been trained based on text data. Then the characteristics of the training samples and of the test samples are extracted using a first preset algorithm, and the optimal model parameters of a logistic regression model are computed by an iterative algorithm based on the characteristics of the training samples. The logistic regression model with the optimal model parameters is then evaluated based on the characteristics of the test samples and the area AUC under the ROC curve, so as to train and obtain a first theme classifier. Afterwards, the first theme classifier is used to classify the text data to determine the theme to which the text data belongs, and a score of the theme to which the text data belongs is computed according to the logistic regression model containing the optimal model parameters. Then based on the score and a second preset algorithm, a confidence score of the user who writes the text data being interested in the theme is computed. Thus, the confidence score is based on to identify the interest of the user. In the above manner, the present disclosure uses the first preset algorithm to extract the characteristics of the training samples and the test samples, thus shortening the time required for feature extraction and model training, and so improving the classification efficiency. The present disclosure adopts a manual labeling method to select the training samples, and further uses the area AUC under the ROC curve to evaluate the logistic regression model with the optimal model parameters so as to train and obtain the theme classifier, thus improving the accuracy of the theme classification. Meanwhile, the present disclosure utilizes the logistic regression model with an optimal model parameters as well as a second preset algorithm, which can improve the accuracy of the confidence score calculation. Thus, based on the computed confidence score of the user being interested in the theme, the user's interest can be identified, helping the enterprises to understand the user in a comprehensive way and thereby quickly and accurately locate the potential customers, thereby improving the marketing efficiency.

On the basis of the first embodiment illustrated in FIG. 2, FIG. 5 is a detailed flowchart illustrating the block of "obtaining training samples and test samples, where the training samples are obtained by manually labeling after the corresponding topic models have been trained based on text data". As illustrated in the detailed flowchart, block S100 includes the following operations S110, S120, and S130.

In S110, the block includes collecting text data, and preprocessing the text data to obtain a corresponding first keyword set.

In the embodiments according to this disclosure, the text data can be obtained from various major social networking platforms, such as microblogs, QQ Zone, Zhihu, Baidu Post Bar, etc., and may also be obtained from various major information resource databases, such as Tencent Video, HowNet, and e-newsletters, etc. In this embodiment, the microblog text is taken as an example. Specifically, the microblog text data can be collected through Sina API (Application Programming Interface), so that the Sina microblog textdata can be obtained, where the text data includes microblog text and comments.

In the embodiments according to this disclosure, the process of preprocessing the text data includes performing word segmentation on the text data, performing part-of-speech tagging, and then removing the stop words in the text data after the word segmentation based on a preset stop word table, so as to obtain a second keyword set. Further, a term frequency TF, an inverse document frequency (IDF), as well as a term frequency-inverse document frequency (TF-IDF) value of each keyword in the second keyword set are computed, and then the keywords whose TF-IDF values are each lower than a preset TF-IDF threshold are removed, so as to obtain the corresponding first keyword set.

In S120, the block includes computing a distribution of the text data on a preset number of topics using a preset theme model based on the first keyword set and the preset number of topics, and clustering the text data based on the distribution of the text data on the topics to train and obtain corresponding topic models of the text data.

In the embodiments according to this disclosure, the preset theme model adopts an LDA (Latent Dirichlet Allocation) topic model, which is an unsupervised machine learning technology. The LDA theme model can be used to identify hidden theme information in a large-scale document set or corpus and express each document in the document set as a probability distribution of potential themes, where each potential theme is represented by a probability distribution of terms. Specifically, in this embodiment, when the terminal receives the input first keyword set and the set number of topics, the LDA theme model would compute the distribution of the topics on the keywords and the distribution of the text data on the topics based on the distribution of the keywords in the documents. Further, the text data is clustered based on the distribution of the text data on the topics to train and obtain corresponding topic models of the text data.

In S130, the block includes selecting from among the text data the training samples that correspond to a target theme classifier based on the manual labeling results on the text data based on the topic models, and using the text data other than the training samples as the test samples.

In this embodiment, because the LDA model is a topic generative model that the types of the obtained topics cannot be controlled, the obtained topics need to be manually labeled to select the text data that corresponds to the target theme. As such, the selected text data would be used as the training samples for the theme classifier, which is beneficial to improve the classification accuracy of the theme classifier. In addition, the text data other than the training samples will be used as the test samples for evaluating the trained logistic regression model.

On the basis of the first embodiment illustrated in FIG. 2, FIG. 6 shows a detailed flowchart illustrating the block of "plotting a receiver operating characteristic (ROC) curve based on the characteristics of the test sample and the logistic regression model containing the optimal model parameters, and evaluating the logistic regression model containing the optimal model parameters based on an area AUC under the ROC curve so as to train and obtain a first theme classifier". As illustrated in the detailed flowchart, block S300 includes the following operations S310 to S350.

In S310, the block includes substituting the second hash table into the logistic regression model containing the optimal model parameters to obtain a true positive TP, a true negative TN, a false negative FN, and a false positive FP.

In S320, the block includes plotting an ROC curve based on the TP, TN, FN, and FP.

In S330, the block includes calculating the area AUC under the ROC curve, and evaluating the logistic regression model containing the optimal model parameters based on the AUC value.

In S340, the block includes: when the AUC value is less than or equal to a preset AUC threshold, determining that the logistic regression model with the optimal model parameter does not meet the requirements, and returning to the following operation: computing the optimal model parameters of the logistic regression model using the iterative algorithm so as to train and obtain the logistic regression model containing the optimal model parameters.

In S350, the block includes: otherwise when the AUC value is greater than the preset AUC threshold, determining that the logistic regression model containing the optimal model parameters meets the requirements, and training to obtain the first theme classifier.

In this embodiment, the second hash table is substituted into the logistic regression model containing the optimal model parameters to analyze the test samples. There are four cases as follows. In a first case, if a set of text data belongs to a topic and is predicted by the logistic regression model containing the optimal model parameters to belong to this topic, then this set of text data is a true positive TP. In a second case, if a set of text data does not belong to a topic and is predicted to not belong to this topic, then this set of text data is a true negative. In a third case, if a set of text data belongs to a topic but is predicted not to belong to this topic, then this set of text data is a false negative FN. In a fourth case, if a set of text data does not belong to a topic but is predicted to belong to this topic, then it is a false positive FP.

Further, the ROC curve is plotted based on the TP, TN, FN, and FP. Specifically, the ROC curve takes the false positive rate FPR as the abscissa and the true positive rate TPR as the ordinate. The specific calculation formula is as follows:

$$FPR=FP/(FP+TN), TPR=TP/(TP+FN);$$

Further, the area AUC under the ROC curve is calculated using the following calculation formula:

$$AUC = \int_0^1 TPR \, dFPR = \frac{1}{(TP+FN)(TN+FP)} \int_0^1 TP \, dFP;$$

In this embodiment, the greater the AUC value, the better the performance of the logistic regression model containing the optimal model parameters. When the calculated AUC value is less than or equal to a preset AUC threshold, the logistic regression model with the optimal model parameter would then be determined as not meeting the requirements, and the process would return to the following operation: computing the optimal model parameters of the logistic regression model using the iterative algorithm so as to train and obtain the logistic regression model containing the optimal model parameters. Until the AUC value is greater than the preset AUC threshold, the logistic regression model containing the optimal model parameters would then be determined as meeting the requirements, and training to obtain the first theme classifier.

On the basis of the first embodiment illustrated in FIG. 2, FIG. 7 shows a flowchart of a second embodiment of the method for identifying a user interest, the method further including the following blocks S600 to S900.

In S600, the method includes substituting the second hash table into the first theme classifier to obtain a probability that the test sample belongs to a corresponding topic.

In S700, the method includes adjusting the preset AUC threshold, and calculating an accuracy rate p and a recall rate r based on the TP, FP, and FN.

In S800, the method includes: when the p is less than or equal to a preset p threshold, or the r is less than or equal to a preset r threshold, returning to the following operation: adjusting the preset AUC threshold until the p is greater than the preset p threshold and the r is greater than the preset r threshold, and training to obtain a second theme classifier.

In S900, the method includes classifying the text data using the second theme classifier to determine a theme to which the text data belongs, and computing a score of the theme to which the text data belongs according to the logistic regression model containing the optimal model parameters.

It should be noted that with respect to the first embodiment shown in FIG. 2, the second embodiment as illustrated in FIG. 7 differs in that: in actual use, due to excessive text data, manually labeling the samples would be extremely labor intensive making it unable to cover all possible text data, thus resulting in poor performance. In addition, when using the area AUC under the ROC curve to evaluate the logistic regression model containing the optimal model parameters, 0.5 is used as the preset AUC threshold by default. Thus, with an AUC value greater than 0.5, then the logistic regression model would make a predicted result of 1, which means it belongs to this topic. Otherwise with an AUC value less than or equal to 0.5, then the logistic regression model would make a predicted result of 0, meaning it does not belong to this topic. Therefore, in the second embodiment, by adjusting the preset AUC threshold, the classification accuracy of the second topic classifier is further improved while ensuring the accuracy rate p and the recall rate r.

In the embodiments according to this disclosure, the second hash table is substituted into the first theme classifier to obtain the probability that the test sample belongs to the corresponding topic. Further, the preset AUC threshold is adjusted, and the accuracy rate p and the recall rate r are calculated based on the TP, FP, and FN, where the calculation formula is as follows:

$$p = \frac{TP}{TP+FP}, r = \frac{TP}{TP+FN},$$

when the p is less than or equal to a preset p threshold, or the r is less than or equal to a preset r threshold, returning to the following operation: the preset AUC threshold will continue to be adjusted until the p is greater than the preset p threshold and the r is greater than the preset r threshold, and training to obtain a second theme classifier, and then the second theme classifier will be used to classify the text data.

On the basis of the embodiment shown in FIG. 5, FIG. 8 is a detailed flowchart illustrating the block of "collecting text data and preprocessing the text data to obtain a corresponding first keyword set" in the embodiments according to this disclosure. As illustrated in the detailed flowchart, block S110 includes the following operations S111 to S113.

In S111, the block includes collecting text data, and performing word segmentation on the text data.

In S112, the block includes deleting the stop words in the text data that is word-segmented based on a preset stop word table, so as to obtain a second keyword set.

In S113, the block includes computing a term frequency-inverse document frequency (TF-IDF) value of each keyword in the second keyword set, and removing the keywords whose TF-IDF values are each lower than a preset TF-IDF threshold, so as to obtain the corresponding first keyword set.

Specifically, as illustrated in FIG. 9, there is shown a detailed flowchart illustrating the block of "computing a term frequency-inverse document frequency (TF-IDF) value of each keyword in the second keyword set, and removing the keywords whose TF-IDF values are each lower than a preset TF-IDF threshold, so as to obtain the corresponding first keyword set". As illustrated in the detailed flowchart, block S113 includes the following operations S1131 and S1132.

In S1131, the block includes computing a term frequency (TF) and an inverse document frequency (IDF) of each keyword in the second keyword set.

In S1132, the block includes computing a term frequency-inverse document frequency (TF-IDF) value of each keyword in the second keyword set based on the TF and the IDF, and removing the keywords whose TF-IDF values are each lower than a preset TF-IDF threshold, so as to obtain the corresponding first keyword set.

In the embodiments according to this disclosure, the text data can be obtained from various major social networking platforms, such as microblogs, QQ Zone, Zhihu, Baidu Post Bar, etc., and may also be obtained from various major information resource databases, such as Tencent Video, HowNet, and e-newsletters, etc. In this embodiment, the microblog text is taken as an example. Specifically, the microblog text data can be collected through Sina API (Application Programming Interface), so that the Sina microblog textdata can be obtained, where the text data includes microblog text and comments.

Further, the text data is preprocessed, and the preprocessing process includes performing word segmentation on the text data and performing part-of-speech tagging. It should be noted that the word segmentation process can be implemented by a word segmentation tool, such as the Chinese lexical analysis system ICTCLAS, the Tsinghua University Chinese lexical analysis program THULAC, the language technology platform LTP, and the like. The word segmentation mainly refers to segmenting each item of Chinese text into individual words and then performing part-of-speech tagging, based on the characteristics of the Chinese language.

Further, the preprocessing process further includes deleting the stop words in the text data after the word segmentation based on a preset stop word table. The removal of the stop words is beneficial to increasing the density of the keywords, thereby facilitating the determination of the topic to which the text data belongs. It should be noted that the stop words mainly include two categories. The first category includes some words that are used too frequently, such as "I", "just", etc. Such words will appear in almost every document. The second category includes words that appear frequently in the text but have no practical meaning. Such words will have a certain effect only when they are put into a complete sentence, including modal particles, adverbs, prepositions, conjunctions, etc., e.g., "of", "in", "then", and so on.

Further, the preprocessing process further includes computing a term frequency-inverse document frequency (TF-IDF) value of each keyword in the first keyword set, and removing the keywords whose TF-IDF values are each lower than a preset TF-IDF threshold, so as to obtain the corresponding second keyword set. Specifically, the term frequency (IF) and the inverse document frequency (IDF) are first calculated. TF indicates the frequency at which a keyword appears in the current document, and IDF indicates the distribution of the keyword in the documents of all the text data, which is a measure of the universal importance of a word. The formulas for calculating the TF and IDF are as follows:

$$TF = \frac{n_i}{n}, IDF = \log\frac{N}{1+N_i};$$

where $n_i$ represents the number of times the keyword appears in the current document, n represents the total number of keywords in the current document, N represents the total number of documents in the data set, and $N_i$ represents the number of documents of the text data set on the keyword i.

Further, the TF-IDF value is calculated according to the formula TF-IDF=TF×IDF, and the keywords whose TF-IDF values are lower than the preset TF-IDF threshold are removed, so that the corresponding keyword set is obtained.

In addition, embodiments according to the present disclosure further provide a computer-readable storage medium having stored therein a user interest identification program, which when executed by a processor performs the operations of the method for identifying a user interest as described above.

For the methods implemented when the user interest identification program running on the processor is executed, see the various embodiments of the method for identifying a user interest according to the present disclosure. Thus, they are not to be detailed herein again.

In addition, embodiments according to the present disclosure further provide a device for identifying a user interest, the device including: an acquisition module configured for obtaining training samples and test samples, where the training samples are obtained by manually labeling after the corresponding topic models have been trained based on text data; a first computation module configured for extracting the characteristics of the training samples and of the test samples using a first preset algorithm, computing the optimal model parameters of a logistic regression model using an iterative algorithm based on the characteristics of the training samples, so as to train and obtain a logistic regression model containing the optimal model parameters; a first training module configured for plotting a receiver operating characteristic (ROC) curve based on the characteristics of the test sample and the logistic regression model containing the optimal model parameters, and evaluating the logistic regression model containing the optimal model parameters based on an area AUC under the ROC curve so as to train and obtain a first theme classifier; a second computation module configured for classifying the text data using the first theme classifier to determine a theme to which the text data belongs, and computing a score of the theme to which the text data belongs according to the logistic regression model containing the optimal model parameters; and an identification module configured for computing a confidence score of the user who writes the text data being interested in the theme based on the score and a second preset algorithm, and identifying an interest of the user based on the confidence score.

Further, the identification module includes: a first computation unit configured for computing an average score of the theme to which the text data belongs based on the score and a third preset algorithm; and a second computation unit configured for computing a confidence score of the user who writes the text data being interested in the theme based on the average score and a second preset algorithm, and identifying an interest of the user based on the confidence score; wherein the computation formula of the third preset algorithm is as follows:

$$Avg(u_i, topic_j) = \frac{\sum_{m=1}^{n} s(u_i, tweet_m, topic_j)}{n},$$

where $Avg(u_i, topic_j)$ represents the average score of the user $u_i$ on the theme $topic_j$, $s(u_i, tweet_m, topic_j)$ represents the score of the user $u_i$'s text data $tweet_m$ belonging to the theme $topic_j$ after having been classified, and n represents the total number of text data messages related to the theme $topic_j$ in the user $u_i$'s text data messages $tweet_m$.

Further, the computation formula of the second preset algorithm is as follows:

$$k_j = \frac{10}{\max(TN_j) - \min(TN_j)}, x_{j0} = \text{median}(TN_j),$$

$$s(u_i, topic_j, TN_{ij}) = \frac{TN_{ij} * Avg(u_i, topic_j)}{1 + e^{-k_j*(TN_{ij} - x_{j0})}},$$

where $TN_j$ represents the number of texts of all the users where the users are interested in the theme $topic_j$, $x_{j0}$ denotes a median of $TN_j$, $TN_{ij}$ represents the number of microblogs related to the theme $topic_j$ that are published by the user $u_i$, and $s(u_i, topic_j, TN_{ij})$ denotes the confidence score of the user $u_i$ being interested in the theme $topic_j$.

Further, the computation formula of the second preset algorithm is as follows:

$$k_j = \frac{10}{\max(TN_j) - \min(TN_j)}, x_{j0} = \text{median}(TN_j),$$

$$s(u_i, topic_j, TN_{ij}) = \frac{TN_{ij} * Avg(u_i, topic_j)}{1 + e^{-k_j*(TN_{ij} - x_{j0})}},$$

where $TN_j$ represents the number of texts of all the users where the users are interested in the theme $topic_j$, $x_{j0}$ denotes a median of $TN_j$, $TN_{ij}$ represents the number of microblogs related to the theme $topic_j$ that are published by the user $u_i$, and $s(u_i, topic_j, TN_{ij})$ denotes the confidence score of the user $u_i$ being interested in the theme $topic_j$.

Further, the acquisition module includes: a collection unit configured for collecting text data, and preprocessing the text data to obtain a corresponding first keyword set; a first training unit configured for computing a distribution of the text data on a preset number of topics using a preset theme model based on the first keyword set and the preset number of topics, and clustering the text data based on the distribution of the text data on the topics to train and obtain corresponding topic models of the text data; and a selection unit configured for selecting from among the text data the training samples that correspond to a target theme classifier based on the manual labeling results on the text data based on the topic models, and using the text data other than the training samples as the test samples.

Further, the first training module includes: an establishing unit configured for extracting the characteristics of the training samples and of the test samples respectively using the first preset algorithm, and establishing a first hash table and a second hash table; and a second training unit configured for substituting the first hash table into the logistic regression model, and computing the optimal model parameters of the logistic regression model using the iterative algorithm, so as to train and obtain the logistic regression model containing the optimal model parameters.

Further, the first training module further includes: a third computation unit configured for substituting the second hash table into the logistic regression model containing the optimal model parameters to obtain a true positive TP, a true negative TN, a false negative FN, and a false positive FP; a plotting unit configured for plotting an ROC curve based on the TP, TN, FN, and FP; an evaluation unit configured for calculating the area AUC under the ROC curve, and evaluating the logistic regression model containing the optimal model parameters based on the AUC value; a determination unit configured for, when the AUC value is less than or equal to a preset AUC threshold, determining that the logistic regression model with the optimal model parameter does not meet the requirements, and returning to the following operation: computing the optimal model parameters of the logistic regression model using the iterative algorithm so as to train and obtain the logistic regression model containing the optimal model parameters; and a third training unit configured for, otherwise when the AUC value is greater than the preset AUC threshold, determining that the logistic regression model containing the optimal model parameters meets the requirements, and training to obtain the first theme classifier; where plotting an ROC curve based on the TP, TN, FN, and FP includes: calculating a false positive rate FPR and a true positive rate TPR based on the TP, TN, FN, and FP, where the respective calculation formulas are FPR=FP/(FP+TN), TPR=TP/(TP+FN); and ploting the ROC curve with the FPR as the abscissa and the TPR as the ordinate.

Further, the device for identifying a user interest further includes: a third computation module configured for substituting the second hash table into the first theme classifier to obtain a probability that the test sample belongs to a corresponding topic; a fourth computation module configured for adjusting the preset AUC threshold, and calculating an accuracy rate p and a recall rate r based on the TP, FP, and FN; and a second training module configured for, when the p is less than or equal to a preset p threshold, or the r is less than or equal to a preset r threshold, returning to the following operation: adjusting the preset AUC threshold until the p is greater than the preset p threshold and the r is greater than the preset r threshold, and training to obtain a second theme classifier; where the identification module is further configured for classifying the text data using the second theme classifier to determine a theme to which the text data belongs.

Further, the collection unit includes: a collection sub-unit configured for collecting text data, and performing word segmentation on the text data; an acquisition sub-unit configured for deleting the stop words in the text data that is word-segmented based on a preset stop word table, so as to obtain a second keyword set; a first computation sub-unit configured for computing a term frequency (TF) and an inverse document frequency (IDF) of each keyword in the second keyword set; and a second computation sub-unit configured for computing a term frequency-inverse document frequency (TF-IDF) value of each keyword in the second keyword set based on the TF and the IDF, and removing the keywords whose TF-IDF values are each lower than a preset TF-IDF threshold, so as to obtain the corresponding first keyword set.

As used herein, the terms "including," "comprising," or any other variants thereof are intended to encompass a non-exclusive inclusion, so that processes, methods, articles, or systems that include a series of elements will include not only those elements, but also other elements as well that haven't been explicitly listed or those elements inherent in such processes, methods, articles, or systems. In the absence of further restrictions, the element defined by the phrase "including/comprising a . . . " will not preclude the existence of additional such elements in the processes, methods, articles, or systems that include the element.

The above numbering of embodiments is intended for illustrative purposes only, and is not indicative of the pros and cons of these embodiments.

By the above description of embodiments, it will be evident to those of skill art that the methods according to the above embodiments can be implemented by means of software plus the necessary general-purpose hardware platform; they can of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., a ROM/RAM, a magnetic disk, an optical disk) and may include multiple instructions that, when executed, can cause a computing device (e.g., a mobile phone, a computer, a server, an air conditioner, a network device, etc.), to execute the methods as described in the various embodiments of the disclosure.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A method for identifying a user interest, comprising:

obtaining training samples and test samples, wherein the training samples are obtained by manually labeling after the corresponding topic models have been trained based on text data;

extracting characteristics of the training samples and of the test samples respectively using a first preset algorithm, computing optimal model parameters of a logistic regression model by an iterative algorithm based on the characteristics of the training samples, to train and obtain a logistic regression model containing the optimal model parameters;

plotting a receiver operating characteristic (ROC) curve based on the characteristics of the test samples and the logistic regression model containing the optimal model parameters, and evaluating the logistic regression model containing the optimal model parameters based on an area AUC under the ROC curve, to train and obtain a first theme classifier;

classifying the text data using the first theme classifier to determine a theme to which the text data belongs, and computing a score of the theme to which the text data belongs based on the logistic regression model containing the optimal model parameters; and computing a confidence score of the user who writes the text data being interested in the theme based on the score and a second preset algorithm, and identifying an interest of the user based on the confidence score.

2. The method of claim 1, wherein the block of "computing a confidence score of the user who writes the text data being interested in the theme based on the score and a second preset algorithm, and identifying an interest of the user based on the confidence score" comprises:

computing an average score of the theme to which the text data belongs based on the score and a third preset algorithm; and computing the confidence score of the user who writes the text data being interested in the theme based on the average score and the second preset algorithm, and identifying the interest of the user based on the confidence score;

wherein the computation formula of the third preset algorithm is as follows:

$$Avg(u_i, topic_j) = \frac{\sum_{m=1}^{n} s(u_i, tweet_m, topic_j)}{n},$$

where $Avg(u_i,topic_j)$ represents the average score of user $u_i$ on theme $topic_j$, $s(u_i,tweet_m,topic_j)$ represents a score of the user $u_i$'s text data $tweet_m$ belonging to the theme $topic_j$ after having been classified, and n represents the total number of text data messages related to the theme $topic_j$ in the user $u_i$'s text data messages $tweet_m$.

3. The method of claim 1, wherein the computation formula of the second preset algorithm is as follows:

$$k_j = \frac{10}{\max(TN_j) - \min(TN_j)}, x_{j0} = \text{median}(TN_j),$$

$$s(u_i, topic_j, TN_{ij}) = \frac{TN_{ij} * Avg(u_i, topic_j)}{1 + e^{-k_j*(TN_{ij} - x_{j0})}},$$

where $TN_j$ represents the number of texts of all the users where the users are interested in theme $topic_j$, $x_{j0}$ denotes a median of $TN_j$, $TN_{ij}$ represents the number of microblogs related to the theme $topic_j$ that are published by user $u_i$, and $s(u_i,topic_j,TN_{ij})$ denotes the confidence score of the user $u_i$ being interested in the theme $topic_j$.

4. The method of claim 1, wherein the block of "obtaining training samples and test samples, wherein the training samples are obtained by manually labeling after the corresponding topic models have been trained based on text data" comprises:
collecting the text data, and preprocessing the text data to obtain a corresponding first keyword set;
computing a distribution of the text data on a preset number of topics using a preset theme model based on the first keyword set and the preset number of topics, and clustering the text data based on the distribution of the text data on the topics, to train and obtain the corresponding topic models of the text data; and
selecting from among the text data the training samples that correspond to a target theme classifier based on the manual labeling results on the text data based on the topic models, and using the text data other than the training samples as the test samples.

5. The method of claim 4, wherein the block of "collecting the text data, and preprocessing the text data to obtain a corresponding first keyword set" comprises:
collecting the text data, and performing word segmentation on the text data;
deleting stop words in the text data after the word segmentation based on a preset stop word table, to obtain a second keyword set;
computing a term frequency (TF) and an inverse document frequency (IDF) of each keyword in the second keyword set; and
computing a term frequency-inverse document frequency (TF-IDF) value of each keyword in the second keyword set based on the TF and the IDF, and removing the keywords whose TF-IDF values are lower than a preset TF-IDF threshold, to obtain the corresponding first keyword set.

6. The method of claim 1, wherein the block of "extracting characteristics of the training samples and of the test samples respectively using a first preset algorithm, computing optimal model parameters of a logistic regression model by an iterative algorithm based on the characteristics of the training samples, to train and obtain the logistic regression model containing the optimal model parameters" comprises:
extracting the characteristics of the training samples and of the test samples respectively using the first preset algorithm, and establishing a first hash table and a second hash table, respectively; and
substituting the first hash table into the logistic regression model, and computing the optimal model parameters of the logistic regression model using the iterative algorithm, to train and obtain the logistic regression model containing the optimal model parameters.

7. The method of claim 6, wherein the block of "plotting an ROC curve based on the characteristics of the test samples and the logistic regression model containing the optimal model parameters, and evaluating the logistic regression model containing the optimal model parameters based on an area AUC under the ROC curve, to train and obtain a first theme classifier" comprises:
substituting the second hash table into the logistic regression model containing the optimal model parameters to obtain a true positive TP, a true negative TN, a false negative FN, and a false positive FP;
plotting the ROC curve based on the TP, TN, FN, and FP;
calculating the area AUC under the ROC curve, and evaluating the logistic regression model containing the optimal model parameters based on the AUC value;
when the AUC value is less than or equal to a preset AUC threshold, determining that the logistic regression model containing the optimal model parameter does not meet the requirements, and returning to the following operation: computing the optimal model parameters of the logistic regression model using the iterative algorithm so as to train and obtain the logistic regression model containing the optimal model parameters;
otherwise when the AUC value is greater than the preset AUC threshold, determining that the logistic regression model containing the optimal model parameters meets the requirements, and training to obtain the first theme classifier; wherein plotting the ROC curve based on the TP, TN, FN, and FP comprises:
calculating a false positive rate FPR and a true positive rate TPR based on the TP, TN, FN, and FP, wherein their respective calculation formulas are FPR=FP/(FP+TN), TPR=TP/(TP+FN); and
ploting the ROC curve taking the FPR as the abscissa and the TPR as the ordinate.

8. The method of claim 7, wherein subsequent to the block of "plotting an ROC curve based on the characteristics of the test samples and the logistic regression model containing the optimal model parameters, and evaluating the logistic regression model containing the optimal model parameters based on an area AUC under the ROC curve, to train and obtain the first theme classifier", the method further comprising the following operations:
substituting the second hash table into the first theme classifier to obtain a probability that the test samples belong to a corresponding topic;
adjusting the preset AUC threshold, and calculating an accuracy rate p and a recall rate r based on the TP, FP, and FN;
when the p is less than or equal to a preset p threshold, or the r is less than or equal to a preset r threshold, returning to the following operation: adjusting the preset AUC threshold until the p is greater than the preset p threshold and the r is greater than the preset r threshold, and training to obtain a second theme classifier;

wherein classifying the text data using the first theme classifier to determine the theme to which the text data belongs comprises the following operation:

classifying the text data using the second theme classifier to determine the theme to which the text data belongs.

9. A device for identifying a user interest, the device comprising a memory, a processor, and a user interest identification program that is stored on the memory and operable on the processor, the user interest identification program when executed by the processor performing the following operations:

obtaining training samples and test samples, wherein the training samples are obtained by manually labeling after the corresponding topic models have been trained based on text data;

extracting characteristics of the training samples and of the test samples respectively using a first preset algorithm, computing optimal model parameters of a logistic regression model by an iterative algorithm based on the characteristics of the training samples, to train and obtain a logistic regression model containing the optimal model parameters;

plotting a receiver operating characteristic (ROC) curve based on the characteristics of the test samples and the logistic regression model containing the optimal model parameters, and evaluating the logistic regression model containing the optimal model parameters based on an area AUC under the ROC curve, to train and obtain a first theme classifier;

classifying the text data using the first theme classifier to determine a theme to which the text data belongs, and computing a score of the theme to which the text data belongs based on the logistic regression model containing the optimal model parameters; and computing a confidence score of the user who writes the text data being interested in the theme based on the score and a second preset algorithm, and identifying an interest of the user based on the confidence score.

10. The device of claim 9, wherein the user interest identification program when executed by the processor performs the following operations:

computing an average score of the theme to which the text data belongs based on the score and a third preset algorithm; and computing the confidence score of the user who writes the text data being interested in the theme based on the average score and the second preset algorithm, and identifying the interest of the user based on the confidence score;

wherein the computation formula of the third preset algorithm is as follows:

$$Avg(u_i, topic_j) = \frac{\sum_{m=1}^{n} s(u_i, tweet_m, topic_j)}{n},$$

where $Avg(u_i, topic_j)$ represents the average score of user $u_i$ on theme $topic_j$, $s(u_i, tweet_m, topic_j)$ represents a score of the user $u_i$'s text data $tweet_m$ belonging to the theme $topic_j$ after having been classified, and n represents the total number of text data messages related to the theme $topic_j$ in the user $u_i$'s text data messages $tweet_m$.

11. The device of claim 9, wherein the computation formula of the second preset algorithm is as follows:

$$k_j = \frac{10}{\max(TN_j) - \min(TN_j)}, x_{j0} = \text{median}(TN_j),$$

$$s(u_i, topic_j, TN_{ij}) = \frac{TN_{ij} * Avg(u_i, topic_j)}{1 + e^{-k_j*(TN_{ij}-x_{j0})}},$$

where $TN_j$ represents the number of texts of all the users where the users are interested in theme $topic_j$, $x_{j0}$ denotes a median of $TN_j$, $TN_{ij}$ represents the number of microblogs related to the theme $topic_j$ that are published by user $u_i$, and $s(u_i, topic_j, TN_{ij})$ denotes the confidence score of the user $u_i$ being interested in the theme $topic_j$.

12. The device of claim 9, wherein the user interest identification program when executed by the processor performs the following operations:

collecting the text data, and preprocessing the text data to obtain a corresponding first keyword set;

computing a distribution of the text data on a preset number of topics using a preset theme model based on the first keyword set and the preset number of topics, and clustering the text data based on the distribution of the text data on the topics, to train and obtain the corresponding topic models of the text data; and selecting from among the text data the training samples that correspond to a target theme classifier based on the manual labeling results on the text data based on the topic models, and using the text data other than the training samples as the test samples.

13. The device of claim 12, wherein the user interest identification program when executed by the processor performs the following operations:

collecting the text data, and performing word segmentation on the text data;

deleting stop words in the text data after the word segmentation based on a preset stop word table, to obtain a second keyword set;

computing a term frequency (TF) and an inverse document frequency (IDF) of each keyword in the second keyword set; and computing a term frequency-inverse document frequency (TF-IDF) value of each keyword in the second keyword set based on the TF and the IDF, and removing the keywords whose TF-IDF values are lower than a preset TF-IDF threshold, to obtain the corresponding first keyword set.

14. The device of claim 9, wherein the user interest identification program when executed by the processor performs the following operations:

extracting the characteristics of the training samples and of the test samples respectively using the first preset algorithm, and establishing a first hash table and a second hash table, respectively; and substituting the first hash table into the logistic regression model, and computing the optimal model parameters of the logistic regression model using the iterative algorithm, to train and obtain the logistic regression model containing the optimal model parameters.

15. The device of claim 14, wherein the user interest identification program when executed by the processor performs the following operations:

substituting the second hash table into the logistic regression model containing the optimal model parameters to obtain a true positive TP, a true negative TN, a false negative FN, and a false positive FP;

plotting the ROC curve based on the TP, TN, FN, and FP;

calculating the area AUC under the ROC curve, and evaluating the logistic regression model containing the optimal model parameters based on the AUC value;

when the AUC value is less than or equal to a preset AUC threshold, determining that the logistic regression model containing the optimal model parameter does not meet the requirements, and returning to the following operation: computing the optimal model parameters of the logistic regression model using the iterative algorithm so as to train and obtain the logistic regression model containing the optimal model parameters;

otherwise when the AUC value is greater than the preset AUC threshold, determining that the logistic regression model containing the optimal model parameters meets the requirements, and training to obtain the first theme classifier; wherein plotting the ROC curve based on the TP, TN, FN, and FP comprises:

calculating a false positive rate FPR and a true positive rate TPR based on the TP, TN, FN, and FP, wherein their respective calculation formulas are FPR=FP/(FP+TN), TPR=TP/(TP+FN); and ploting the ROC curve taking the FPR as the abscissa and the TPR as the ordinate.

16. The device of claim 15, wherein the user interest identification program when executed by the processor performs the following operations:

substituting the second hash table into the first theme classifier to obtain a probability that the test samples belong to a corresponding topic;

adjusting the preset AUC threshold, and calculating an accuracy rate p and a recall rate r based on the TP, FP, and FN;

when the p is less than or equal to a preset p threshold, or the r is less than or equal to a preset r threshold, returning to the following operation: adjusting the preset AUC threshold until the p is greater than the preset p threshold and the r is greater than the preset r threshold, and training to obtain a second theme classifier;

wherein classifying the text data using the first theme classifier to determine the theme to which the text data belongs includes the following operation:

classifying the text data using the second theme classifier to determine the theme to which the text data belongs.

17. A computer-readable storage medium having stored therein a user interest identification program, which when executed by a processor performs the following operations:

obtaining training samples and test samples, wherein the training samples are obtained by manually labeling after the corresponding topic models have been trained based on text data;

extracting characteristics of the training samples and of the test samples respectively using a first preset algorithm, computing optimal model parameters of a logistic regression model by an iterative algorithm based on the characteristics of the training samples, to train and obtain a logistic regression model containing the optimal model parameters;

plotting a receiver operating characteristic (ROC) curve based on the characteristics of the test samples and the logistic regression model containing the optimal model parameters, and evaluating the logistic regression model containing the optimal model parameters based on an area AUC under the ROC curve, to train and obtain a first theme classifier;

classifying the text data using the first theme classifier to determine a theme to which the text data belongs, and computing a score of the theme to which the text data belongs based on the logistic regression model containing the optimal model parameters; and computing a confidence score of the user who writes the text data being interested in the theme based on the score and a second preset algorithm, and identifying an interest of the user based on the confidence score.

18. The computer-readable storage medium of claim 17, wherein the computation formula of the second preset algorithm is as follows:

$$k_j = \frac{10}{\max(TN_j) - \min(TN_j)}, x_{j0} = \text{median}(TN_j),$$

$$s(u_i, topic_j, TN_{ij}) = \frac{TN_{ij} * Avg(u_i, topic_j)}{1 + e^{-k_j*(TN_{ij}-x_{j0})}},$$

where $TN_j$ represents the number of texts of all the users where the users are interested in theme $topic_j$, $x_{j0}$ denotes a median of $TN_j$, $TN_{ij}$ represents the number of microblogs related to the theme $topic_j$ that are published by user $u_i$, and $s(u_i,topic_j,TN_{ij})$ denotes the confidence score of the user $u_i$ being interested in the theme $topic_j$.

19. The computer-readable storage medium of claim 17, wherein the user interest identification program when executed by the processor performs the following operations:

collecting the text data, and preprocessing the text data to obtain a corresponding first keyword set;

computing a distribution of the text data on a preset number of topics using a preset theme model based on the first keyword set and the preset number of topics, and clustering the text data based on the distribution of the text data on the topics, to train and obtain the corresponding topic models of the text data; and selecting from among the text data the training samples that correspond to a target theme classifier based on the manual labeling results on the text data based on the topic models, and using the text data other than the training samples as the test samples.

20. The computer-readable storage medium of claim 17, wherein the user interest identification program when executed by the processor performs the following operations:

extracting the characteristics of the training samples and of the test samples respectively using the first preset algorithm, and establishing a first hash table and a second hash table, respectively; and substituting the first hash table into the logistic regression model, and computing the optimal model parameters of the logistic regression model using the iterative algorithm, to train the logistic regression model containing the optimal model parameters.

\* \* \* \* \*